United States Patent [19]

Riezinstein

[11] Patent Number: 4,718,822

[45] Date of Patent: Jan. 12, 1988

[54] VERTICALLY ORIENTED WIND DRIVEN ASSEMBLY

[75] Inventor: Thomas Riezinstein, Palmer, Ak.

[73] Assignee: Riezinstein and Malone Industries, Willow, Ak.

[21] Appl. No.: 911,529

[22] Filed: Sep. 25, 1986

[51] Int. Cl.⁴ ............................................. F03D 7/06
[52] U.S. Cl. ..................................... 416/119; 416/87; 416/139; 416/197 A
[58] Field of Search .......... 416/44 A, 87, 119, 139 A, 416/197 A

[56] References Cited

U.S. PATENT DOCUMENTS

| 294,943 | 3/1884 | White | 416/119 |
|---|---|---|---|
| 475,869 | 5/1892 | Johnson | 416/119 |
| 823,404 | 6/1906 | Fuller | 416/44 A |
| 1,299,151 | 4/1919 | Ebert | 416/119 |
| 1,341,045 | 5/1920 | Curey | 416/139 A |
| 1,646,673 | 10/1927 | Wilson | 416/168 |
| 1,697,574 | 1/1929 | Savonius | 416/DIG. 9 |
| 3,093,194 | 6/1963 | Rusconi | 416/44 A |
| 3,942,909 | 3/1976 | Yengst | 416/119 X |
| 4,047,834 | 9/1977 | Magoveny et al. | 415/3 |
| 4,061,926 | 12/1977 | Peed | 290/55 |
| 4,274,011 | 6/1981 | Garfinkle | 290/55 |
| 4,293,274 | 10/1981 | Gilman | 416/51 |
| 4,410,806 | 10/1983 | Brulle | 290/44 |
| 4,419,587 | 12/1983 | Benton | 290/44 |

FOREIGN PATENT DOCUMENTS

| 103671 | 4/1938 | Australia | 416/DIG. 9 |
|---|---|---|---|
| 2948112 | 6/1981 | Fed. Rep. of Germany | 416/139 A |
| 701036 | 3/1931 | France | 416/119 |
| 771804 | 10/1934 | France | 416/DIG. 9 |
| 126084 | 7/1984 | Japan | 416/44 A |
| 264219 | 1/1927 | United Kingdom | 416/139 A |

Primary Examiner—Everette A. Powell, Jr.
Attorney, Agent, or Firm—Garrison & Stratton

[57] ABSTRACT

A self-governing, vertically oriented wind driven assembly is provided by a pair of open, semicylindrically shaped wind scoops with elongated edges which face each other in a nearly closed position at times of high or maximum wind speeds, and partically face each other and partially exposed into the wind at lower wind speeds. The scoops are pivotally attached to posts oppositely located at the edges of a rotating frame. The amount of exposure of the scoops into the wind is dynamically balanced by springs which tend to open the scoops and by weights which tend to close the scoops proportional to the rotational speed of the assembly. The ends of the scoops are modified to permit the scoops to cooperatively slide from an open to close position. The assembly is connected to an electrical generating means and can be used for producing electrical power on sailboats.

13 Claims, 4 Drawing Figures

VERTICALLY ORIENTED WIND DRIVEN ASSEMBLY

BACKGROUND OF THE INVENTION

This invention relates generally to vertically oriented wind driven assemblies, more particularly to vertically oriented, wind driven assemblies which are rotational speed controlled by relating the exposure of wind capturing elements according to the rotational speed of the assembly.

Commonly called windmill or wind impeller, a wind driven assembly converts wind force into a mode of force for various applications. A wind driven assembly includes generally a rotor or shaft, wind capturing elements attached thereto, and a means to transfer the rotational action of the shaft. Typically, a wind driven assembly is coupled either mechanically or electrically (through an electrical generator means) to various energy consumers such as water pumps, lighting, heating, refrigeration, storage batteries, and the like. An assembly coupled to a means to produce electricity or an electrical generator is called a wind driven electrical generator. Electrical generators are particularly efficient within a narrow range of rotational speeds (RPM) so that whenever the RPM is less than or exceeds this range of RPM, the efficiency of the electrical generator decreases. Therefore, it is of advantage to rotate an electrical generator within this range of RPM independently of the electrical load placed upon the generator. There are other energy consumers which have their maximum energy conversion relating to a constant rotational speed range of the wind driven assembly.

Because wind velocities vary in both speed and direction, it is advantageous to have an assembly which maximizes the usefulness of the wind energy over a variety of wind conditions. When coupled to an electrical generator, it is advantageous to control the speed of the wind driven assembly so that the RPM of the wind driven assembly matches the efficiency range of the coupled electrical generator independently of the load on the generator.

The wind's variability covers a wide range of speeds, from still or generally zero wind speed to gusts and gales over 100 miles per hour. The forces upon a wind impelled assembly vary with the square of the speed of the wind and the power, that is the rate at which wind can be made to do work varies with the cube of velocity. An important consideration is effect of wind speed upon the wind driven assembly itself, the assembly should be protected from gales and gusts while adapting to variable wind conditions. A substantially cylindrical shape offers a smooth or neutral rotational exposure to the wind; that is, a vertically oriented cylindrical element mounted axially should not rotate in either direction irrespective of wind speed.

A particular advantage of a vertically oriented wind driven assembly is that it operates independently of wind direction and responds to wind speed only. Additionally, it is advantageous to have the wind capturing elements at increased or maximum exposure to the forces of the wind at low wind velocities and minimum, nearly neutral, exposure to the wind at higher wind velocities.

There are various strategies described in the prior art to control the rotational speed of a wind driven assembly: Brulle, U.S. Pat. No. 4,410,806, describes a vertical axis windmill having articulated vertical blades, the profile and orientation of the blades being adjustable for a constant rotational velocity by a microprocessor controlled actuator. Peed, U.S. Pat. No. 4,061,926, teaches a vertical axis windmill having a pair of oppositely rotating co-axial turbines, the speed of the turbines controlled by small, peripherally located, concave air scoops. The air scoops retract from the wind according to centrifugal forces acting upon masses linked to the scoops, or extend into the wind according to springs, the spring balanced against the centrifugal forces on the masses. Magoveny et al., U.S. Pat. No. 4,047,834, discloses air scoops peripherally attached to an inner rotor, the profile of the air scoops changing according to wind currents passing between funnel-shaped passages.

These devices either fail to offer a smooth or nearly neutral configuration to the wind under extreme wind conditions and are very complex in design.

There exist a particular need for means to recharge electrical storage batteries on sailing vessels. Sailboats often use appliances which depend upon electricity for their power viz., navigational equipment, lights, radios, starters for auxiliary engines and the like. Most sailboats now use small, gasoline powered electrical generators to periodically recharge their batteries, or periodically run auxiliary engines coupled to electrical generators to recharge their batteries. The systems require periodic monitoring of the storage batteries to determine when the batteries should be recharged.

Typical gasoline powered recharging operations are noisy, and running an auxiliary engine for the sole purpose of recharging storage batteries causes excessive wear on the engines. To avoid these problems, some boats have employed solar charging grids which convert solar energy directly into electrical energy, typically for trickle generators. There also exists small wind impelled electrical generators for electrical power production which are not speed governing. These systems are mounted at or near the bottom of a mast or set upon a boat deck where they can be quickly removed during periods of very high winds. The wind speed at the deck level is low and variable compared to the wind speed which exists about and above the sail area. It can be appreciated that these wind generators must be removed during periods of high wind or when the activity aboard the vessels are impeded by these generators.

Accordingly, one object of the present invention is to provide a new and improved vertically oriented wind driven assembly.

Another object is to provide for a new and improved self-governing vertically oriented wind driven assembly with a mass impelled governing system linking mass means to a lever system controlling semicylindrical shaped wind scoops.

Still another object is to provide a self regulating vertically oriented wind driven assembly having scoops which extend and retract according to rotational velocity, thereby maintaining a useful rotational speed of the assembly.

Another object is to provide a self-governing vertically oriented wind driven assembly that adapts to various wind speeds by controlling the position of wind scoops, movable from an open, fully exposed position for low wind speeds, to a closed position, forming a substantially neutral profile configuration for high wind speeds. Another object of the present invention is to provide a self-governing vertically oriented wind driven assembly wherein the rotational speed of the assembly is fairly constant independently of wind velocity and load upon the energy consuming means.

An additional object of the present invention is to provide a new and improved vertically oriented wind driven assembly which offers a smooth or nearly neutral exposure to the wind under extremely high wind velocities.

A still further object of this invention is to provide for a lightweight, self speed regulating, electrical generator which is exposed to the wind at an elevated location on a boat.

It is another object of the present invention to obtain the foregoing objects and also provide for an improved wind-impelled electrical generator assembly that is self speed regulating, that is maximally exposed in low or null wind speeds, yet substantially unaffected by periods of high winds and which is sufficiently durable to withstand exposure to the elements.

SUMMARY OF THE INVENTION

The present invention is embodied in a pair of vertically oriented, pivotally mounted convexo-concave wind scoops which are constructed and pivotally oriented to receive forces from wind and to convert the wind forces into rotative motion. The scoops are each pivotally mounted on a rotatable frame so that the scoops may open and close as described below to receive the requisite amount of wind force to cause a generally predetermined rotational speed of the frame. In periods of high wind forces, the concave side of the scoops cooperatively face each other in a closed position to present a generally convex composite figure which is nearly neutral to the wind. The scoops are linked to cooperatively pivot each around its outer pivot axis upon the frame to expose the concave faces to the wind and thereby induce rotation of the frame carrying the scoops.

The pivot axis of each wind scoop lies vertically along or near the convex portion of the scoop; the scoops pivoting around oppositely located posts at the edge of the frame.

The wind scoops are attached to a system of linkage means including centrifugal governor weights. Springs bias the wind scoops partially toward an open position, while a balance point is found between the centrifugal weights and the wind velocity. The governor weights are positioned so that centrifugal forces progressively close the wind scoops as the rotational velocity of the structure frame increases. The wind forces, tending to open the wind scoops, are dynamically balanced by the centrifugal forces imparted by the weights. The weights tend to close the wind scoops whenever the rotational speed of the frame increases, while the force of the wind tends to open the wind scoops whenever the rotational speed of the frame decreases. Means to bias the scoops toward the open position may also be used.

Alternatively, the scoops can be attached to a control means which senses rotational speeds of the frame to adjust the exposure of the scoops into the wind accordingly.

The frame with the scoops and control systems are fixed onto a power output rotor or shaft which can be coupled to an electrical generator or other energy consumer means.

Importantly, each wind scoop moves relative to and in concert with the other, thereby increasing exposure of the face of the scoops to the wind at low wind speed conditions while minimizing exposure to the wind during periods of high or destructive wind speeds While the system described in a preferred embodiment can be dimensioned to be used for a variety of purposes including stationary and mobile energy consumers, the invention is particularly useful when used on a sailboat. A unit incorporating these features can be dimensioned to be used in conjunction with the mast of a sailboat. The assembly is rigged onto an upper portion of the mast above the sail area. The top of the mast generally has the highest wind exposure and, therefore, provides the best opportunity for the use of this invention in a sailboat. The invention can also be suitably dimensioned to fit on the top of the cabin or any location accessible to the wind.

The power output from the alternator or generator can be used for charging the ship's batteries, running radios, lights, refrigeration systems, etc. To overcome initial torque of the system when rotational speeds are low, the electrical system employs a rotational sensor switch which uncouples the electrical load for low rotational speeds.

DESCRIPTION OF A PREFERRED EMBODIMENT

Figures 1, 2:
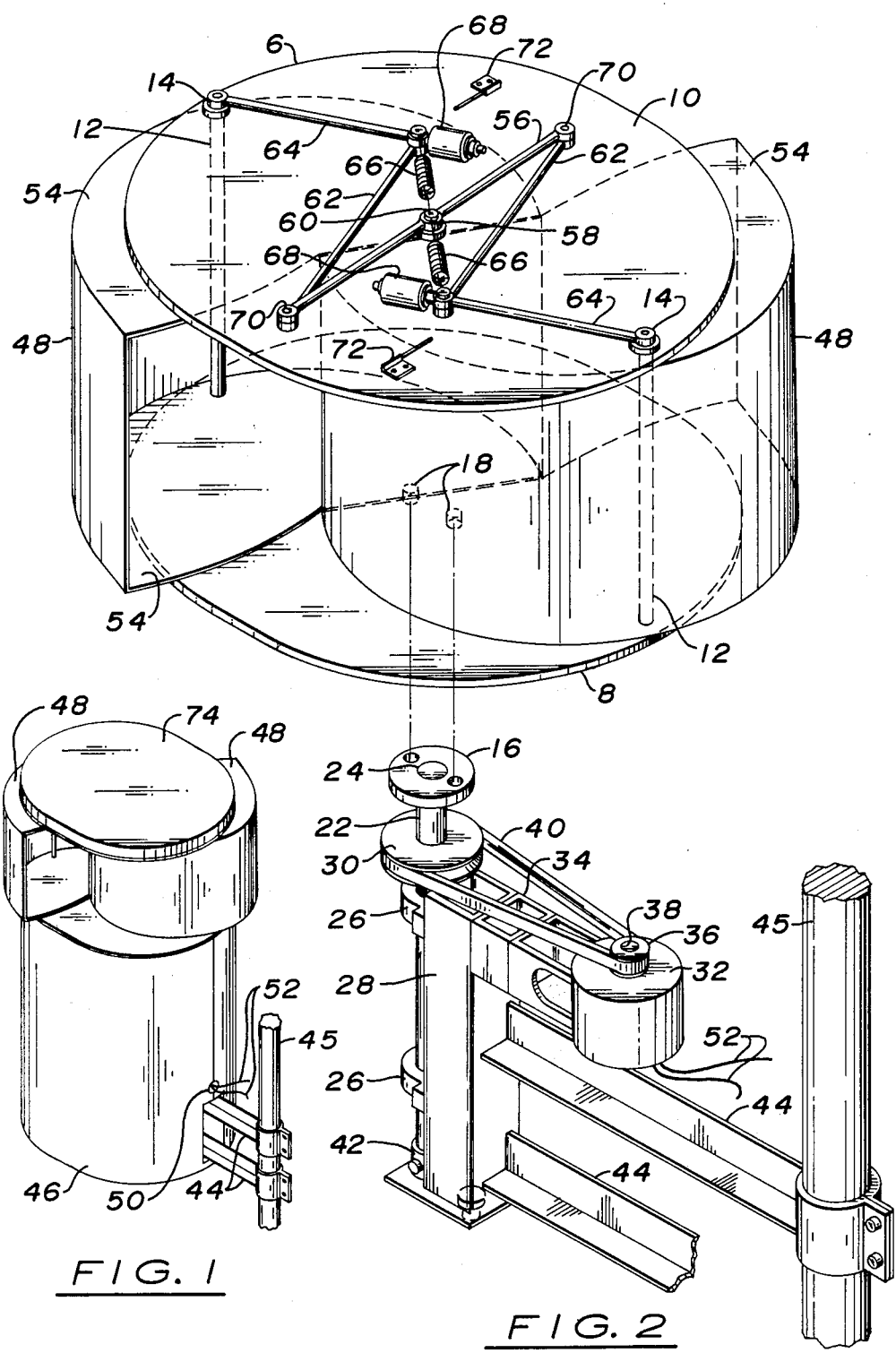
FIG. 1 is an isometric view of a preferred embodiment of a self-governing wind driven assembly in accordance with the present invention.
FIG. 2 is a similar view showing the details of the scoops and operating features.

FIGS. 1 and 2 illustrate a first preferred embodiment of a self-governing wind driven assembly in accordance with the present invention. The assembly is shown coupled through a rotor to an alternator, although the assembly can be coupled to any other electrical generating device or energy consumer. The assembly is capable of and intended to import rotation at a relatively constant velocity under a variety of wind conditions, electrical loads and torques.

Figure 3:
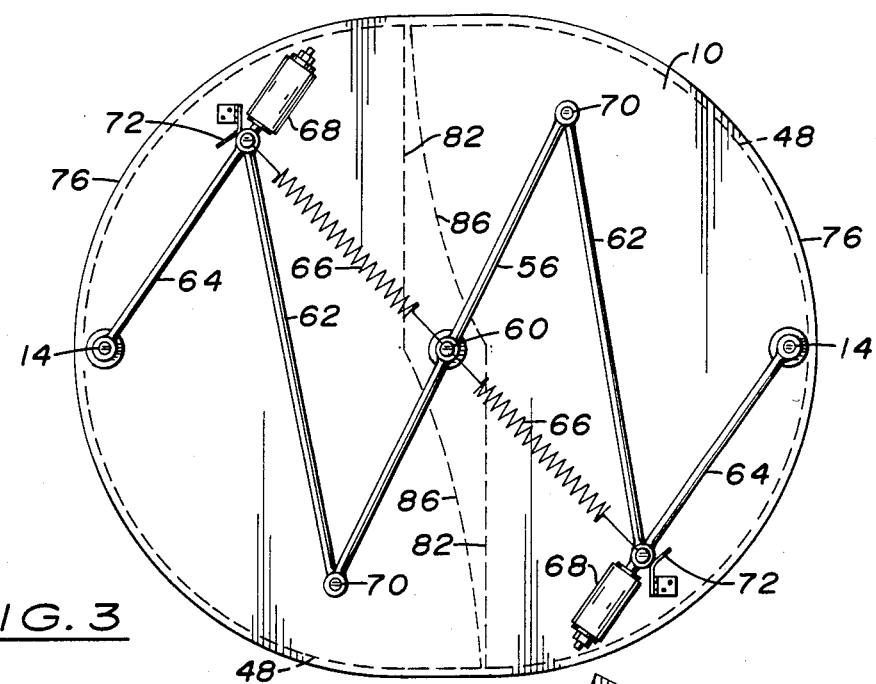
FIG. 3 is a top view of another embodiment of this invention with the top cover removed and the scoops in a closed position.
Figure 4:
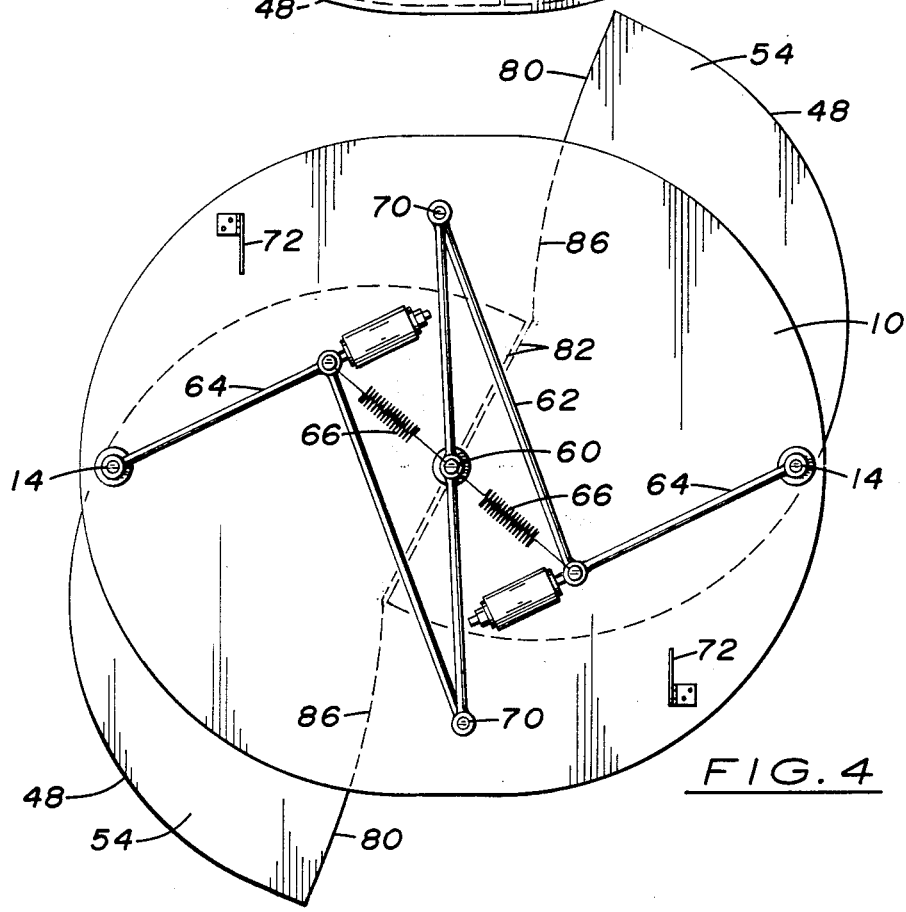
FIG. 4 is another top view of the apparatus shown in FIG. 3 with the scoops in the fully open position.

A second preferred embodiment, simplified by the omission of springs 66 is shown in FIGS. 3 and 4. Except for the absence of springs 66, the two embodiments are identical and will be described together.

The self-governing wind driven assembly as shown includes generally a frame 6 having of a bottom assembly support means 8, a top support means 10, separated by two oppositely located posts 12. The ends of each post are threaded and raised on mounting nuts 14 to join the bottom assembly support means 8 and top support means 10 in a parallel fashion to the posts 12. The bottom assembly support means 8 is rigidly attached to a hub 16 with hold down bolts (not shown) threaded into matching threaded recesses 18 in the bottom assembly support means 8. The output shaft 22, a rotor, is spline fitted into a matching recess 24 through the hub 16 to insure transfer of the rotational action of the assembly to the output shaft 22. The output shaft 22 is held by a pair of bearing blocks 26 onto a mounting member 28. A larger pulley wheel 30 is key fitted (not shown) into the output shaft 22. An electrical generating plant 32 is attached to a stand off 34 which is adjustably jointed (not shown) to mounting member 28. The output rotational energy from output shaft 22 is transferred to the rotating armature 38 of an electrical generating plant 32 by means of a pulley belt 40 and smaller pulley wheel 36 which can be adjusted to a correct tension by adjusting the mounting standoff 34, which is adjustably joined to the mounting member 28.

The mounting member 28 is held by a pair of mounting brackets 44 which can be used to mount the assembly to the mast 45 of a sailboat or any other vertically oriented edifice, such as a cabin or deck.

A fiberglass covering 46 attached to the bottom of the mounting member 28 and around the mounting brackets 44 protect the bottom part of the assembly and provide a streamline configuration to the assembly while allowing the frame 6 to rotate with the output shaft 22. Recess 50 permits the wiring 52 to emerge from the protected bottom part of the assembly.

The wiring is connected in the standard way to storage batteries or energy consumers through a voltage regulator and charge indicator means (not shown). The two identical, convexo-concave, vertically oriented wind capturing scoops 48 are shown in this preferred embodiment as open faced, distorted semicylinders with edges and ends elongated linearly from the circular portion 76 (as shown in FIG. 3) to the edge of the scoops 48. The sides and ends of the semicylinders are extended linearly so that the composite figure of the scoops 48 placed face-to-face in a closed position describe a prolated cylinder with substantially flat surfaces joining the scoops 48.

While other scoop shapes will function according to this invention, the distorted semicylindrical shape has the particular advantage of rapid exposure to the wind when the scoops pivot on posts 12 from a closed position as shown by the broken lines 82 in FIG. 3 to the open position, as shown by the solid lines 80.

Both ends 54 of each scoop 48 are configured by cutting away a portion of each end 54. The removed portions of ends 54 accommodate the complementary position of the opposite facing scoop 48 as the scoops 48 pivot about axis 12. The portion removed from the ends approximates a triangular section with one of the sides 86 curved inwardly into the triangular portion.

Referring to the operating details in FIG. 2, the radially extending member 56 is rotatively mounted to the center of the top assembly support means 10 on a raised center mounting nut 58 using a center mounting pin 60. Each of a pair of control linkage arms 62 is symmetrically attached by one end to an end of the radially extending member 56 and to a mid position of a weighted lever member 64 at the other end. Each of a pair of extension springs 66 is symmetrically attached between the raised center mounting nut 58 and a mid position of the weighted lever member 64. As is shown in FIGS. 3 and 4, the springs may be omitted if desired to simplify the structure. An end of each weighted lever member 64 is locked to the post 12 which in turn is locked to the associated wind capturing elementary 48 so that a rotational movement of the weighted lever member 64 about the axis of the post 12 imparts the rotation movement to the wind capturing element 48. A mass, or weight 68 fits onto the other end of each weighted lever member 64. The control linkage arms 62 are rotatively mounted to the radially extending member 56 and the weighted lever members 64 with pin 70 so that a rotation movement of a weighted lever member 64 about the post 12 imparts a similar rotation to the other weighted lever member 64 about the other post 12. The weights 68 impart an outwardly radial force directly proportional to the rotational speed of the assembly to impart a rotation movement to lever members 64. A pair of spring elements 72 symmetrically placed near the edge of the top assembly support means 10 urge rotors 48 toward the open position as the governor assembly permits, as is best seen in FIGS. 3 and 4. The dynamic balance between opening the scoops and closing the scoops can be adjusted by changing the amount of weight 68, and by changing the positions where the control linkage arms 62 are joined to the weighted lever member 64.

The radially extending member 56, control linkage arms 62, weighted lever members 64, weights 68 and springs 66 are enclosed by a top cover 74 suitably attached to the top assembly support means to streamline the assembly as well as to protect the assembly from the elements. In the alternative embodiment shown in FIGS. 3 and 4 the springs 66 are omitted, reliance being placed upon the spring elements 72 to urge the scoops far enough open to catch the wind, which will then open the scoops fully and begin rotation of the windmill frame structure.

In either embodiment, the wind forces will rapidly induce rotation which will cause the weights 68 to be thrown outwardly by centrifugal forces and whereby tend to close the scoops. A balance results with wind forces balancing the centrifugal forces, thereby holding the scoops at the position needed to maintain rotation at the angular velocity chosen.

In the preferred embodiments shown in the drawings, the cross-section diameter of the assembly may be about 36 inches (91.44 centimeters), and the height of the wind capturing elements approximately 20 inches (50.8 centimeters). The electrical generating plant 32 is an alternator rated at about 30 amperes for energizing a 12 volt D.C. line. The ratio of the diameter of the larger pulley wheel 30 to the diameter of the smaller pulley wheel 36 is three-to-one (3:1). A centrifugal switch 42 connects and disconnects the electrical load to the alternator 32 at about 300 RPM which permits the alternator 32 to free-wheel or spin at lower rotational speeds. This minimizes the start-up torque on the system at very low or start-up speeds, which may act to stall the assembly under conditions of heavy electrical loads. The normal electrical output of the assembly is estimated to be 200 watts in a 10 to 12 knots (18.5 to 22.2 kilometers per hour) wind speed. The entire assembly weighs between 40 to 50 pounds (18.2 to 22.7 kilograms).

Numerous variations, within the scope of the appended claims, will be apparent to those skilled in the art in light of the foregoing description and accompanying drawings. Thus, while a particular design was shown, my invention, in its broader aspects, is compatible with a number of other designs. Likewise, while a particular shaped scoop is shown, other scoop configurations can be employed. Specific design parameters discussed above, and the particular components utilized in the design are for informational purposes only, and are not intended in a limiting sense. Other design criteria may be employed, if desired. While a mechanical self-governing system was described, those skilled in the art will recognize that other speed governing systems which control the exposure of the scoop elements into the wind according to the rotational speed of the assembly can be substituted, if desired. These variations are merely illustrative.

What I claim is:

1. A self-governing wind driven assembly comprising:
   a rotor having a first and a second terminal point;
   a bottom plate rigidly attached to said first terminal point;
   a top plate being similar in shape to said bottom plate, said top plate being supported in a parallel orientation to said bottom plate by a first and a second vertical post, said first and said second post being oppositely located between said top plate and said bottom plate;
   a first and a second scoop, said first and said second scoop each being generally convexo-concave shaped and mounted between said top plate and said bottom plate, said first scoop having a first concave side and a first convex side, said second scoop having a second concave side and a second convex side, said first concave side defining a first open face, said second concave side defining a second open face, said first scoop being pivotally mounted on said first post, said second scoop being pivotally mounted on said second post, said first post having a first axis of rotation located near said first convex side, said second post having a second axis of rotation near said second convex side, said first scoop having a generally closed first and second end, said second scoop having a generally closed third and fourth end, said first, said second, said third and said fourth end being modified to permit said first and said second scoop to be placed with said first open face positioned against said second open face, said first, said second, said third and said fourth end permitting said first and said second scoop to achieve a generally closed configuration, said first, said second, said third and said fourth end permitting said first and said second scoop to slide cooperatively towards either an open or a closed configuration, said first and said second scoop being able to pivot in unison about said first and said second post respectively to and from an open configuration where said first face is oriented partially towards said second face and said first face and said second face are partially extended outward to receive forces from the wind, said closed configuration occurring when said first scoop and said second scoop form an approximate cylinder, said rotation being slower when said assembly is in said closed configuration than when said assembly is in an open configuration; and
   a control means controlling the orientation of said first and said second scoop between said open and said closed configuration, said orientation of said first and said second scoop being related to the rotational speed of said assembly.

2. The self-governing wind driven assembly of claim 1, wherein said control means comprises:
   a spring means biasing the orientation of said first scoop and said second scoop toward said open configuration;
   a mass means reacting to the centrifugal forces produced by the rotation of said assembly; and
   a linkage means interconnectig said mass means, said first scoop and said second scoop, said linkage means controlling said orientation of said first scoop and said second scoop between said open and said closed configuration, said mass means urging the closure of said first scoop and said second scoop in an amount proportional to the rotational speed of said assembly, said mass means being dynamically balanced with said forces from said wind, said first scoop and said second scoop assuming said open configuration at lower rotational speeds and assuming said closed configuration at higher rotational speeds.

3. The self-governing wind driven assembly of claim 2, further comprising a means for adjusting the dynamic balance between said spring means and said mass means to cause said first scoop and said second scoop to substantially close whenever said assembly attains a maximum rotational speed and to cause said first scoop and said second scoop to fully open whenever said assembly is at a minimum rotational speed.

4. The self-governing wind driven assembly of claim 1, further comprising an electricity generating means associated with said rotor to satisfy an electrical load.

5. The self-governing wind driven assembly of claim 4, further comprising a means to connect and disconnect said electrical load to said electricity generating means according to said rotational speed of said assembly.

6. The self-governing wind driven assembly of claim 5, wherein said means to connect and disconnect said electrical load comprises a rotation speed sensor connected to said rotor, said sensor electrically connecting said electrical load to said electricity generating means whenever said sensor detects a rotation speed of said rotor greater than 300 revolutions per minute.

7. The self-governing wind driven assembly of claim 1, wherein said first and said second scoop are semicylindrical and are oriented so that when said assembly is in said closed configuration said assembly generally defines a cylinder.

8. The self-governing wind driven assembly of claim 7, wherein said semicylindrical shape is distorted by extending a pair of vertical edges linearly and parallel from a curved portion of the semicylindrical shape, the ends extending accordingly.

9. The self-governing wind driven assembly of claim 2 further comprising:
   a means to bias said linkage means toward said open configuration.

10. The self-governing wind driven assembly of claim 2, wherein said linkage means comprises: a first and a second lever memeber, said first lever member being rigidly attached to said first scoop, said second lever member being rigidly attached to said second scoop.

11. The self-governing wind driven assembly of claim 2, wherein said mass means is adjustable to vary the reaction of said mass means to said centrifugal forces.

12. The self-governing wind driven assembly of claim 1, wherein said first end has a first curvilinear face, wherein said second end has a second curvilinear face, wherein said third end has a third curvilinear face, wherein said fourth end has a fourth curvilinear face, said first curvilinear face matching said first curvilinear face, said second curvilinear face matching said second curvilinear face, said third curvilinear face matching said third curvilinear face, said fourth curvilinear face matching said fourth curvilinear face, said first, second, third and fourth curvilinear face permitting said first and said second scoop to pivot about said first and said second post respectively and slide cooperatively and in unison between said open and said closed configuration.

13. The self-governing wind driven assembly of claim 1, where in said control means allows said assembly to rotate in only one direction.

* * * * *